(12) United States Patent
Lin et al.

(10) Patent No.: US 10,768,726 B2
(45) Date of Patent: Sep. 8, 2020

(54) CURVED OR SPHERICAL TOUCH DEVICE

(71) Applicants: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

(72) Inventors: Bo-Rong Lin, Hsinchu (TW); Hua-Yueh Hsieh, Hsinchu (TW); Hsuan-Yun Lee, New Taipei (TW); Ching-Lin Li, Zhunan (TW)

(73) Assignees: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan Township (TW)

( * ) Notice: Subject to any disclaimer, the term of this patent is extended or adjusted under 35 U.S.C. 154(b) by 0 days.

(21) Appl. No.: 16/220,312

(22) Filed: Dec. 14, 2018

(65) Prior Publication Data

US 2020/0050299 A1 Feb. 13, 2020

(30) Foreign Application Priority Data

Aug. 10, 2018 (CN) .......................... 2018 1 0909053

(51) Int. Cl.
*G06F 3/041* (2006.01)

(52) U.S. Cl.
CPC .... *G06F 3/041* (2013.01); *G06F 2203/04104* (2013.01)

(58) Field of Classification Search
CPC ... G06F 3/041–047; G06F 2203/04102; G06F 2203/04802
See application file for complete search history.

(56) References Cited

U.S. PATENT DOCUMENTS

| 7,265,686 B2 * | 9/2007 | Hurst ..................... G06F 3/045 341/33 |
| 2018/0224945 A1 * | 8/2018 | Hardie-Bick ........... G06F 3/011 |
| 2019/0064993 A1 * | 2/2019 | Hardie-Bick ......... G06F 3/0416 |
| 2020/0050289 A1 * | 2/2020 | Hardie-Bick ....... G06F 3/04883 |

* cited by examiner

*Primary Examiner* — Gene W Lee
(74) *Attorney, Agent, or Firm* — ScienBiziP, P.C.

(57) ABSTRACT

A touch device in spherical or other curved form includes a hollow spherical casing and at least one touch sensing layer. The spherical casing includes an inner surface and an outer surface, the touch sensing layer is attached to the inner surface of the spherical casing, the touch sensing layer includes a core portion and a touch portion. The touch portion extends and diverges outwardly from the core portion. The touch portion comprises a plurality of sub-touch portions, an area of each sub-touch portion is greater than an area of the core portion. The disclosure also includes a curved non-spherical touch device.

8 Claims, 8 Drawing Sheets

CURVED OR SPHERICAL TOUCH DEVICE

FIELD

The subject matter herein generally relates to a curved touch device, and more particularly to a spherical touch device

BACKGROUND

In recent years, with the advancement of technology, the use of touch modules has become more and more widely used, from common cash machines, smart phones, tablet computers, to industrial touch computers. However, the current mainstream touch modules on the market are mostly straight-type, and the curved surface of some touch modules have only a certain curvature at the edge that is a 2.5D structure. Touch modules with large curvature surfaces, such as spherical or ellipsoidal surfaces, are rare.

In the prior art, the record of the touch module for the large curvature surface is rare, and the technology related to the specific structure and the manufacturing method needs to be improved. In anticipation that the spherical curved surface can be used widely in various applications, the application scene of the spherical curved surface is different from that of the conventional straight type. Marking a spherical touch device that is widely used, convenient to manufacture, and low in cost is problematic.

Therefore, there is room for improvement in the art.

BRIEF DESCRIPTION OF THE DRAWINGS

Implementations of the present disclosure will now be described, by way of example only, with reference to the attached figures.

DETAILED DESCRIPTION

Figure 1:
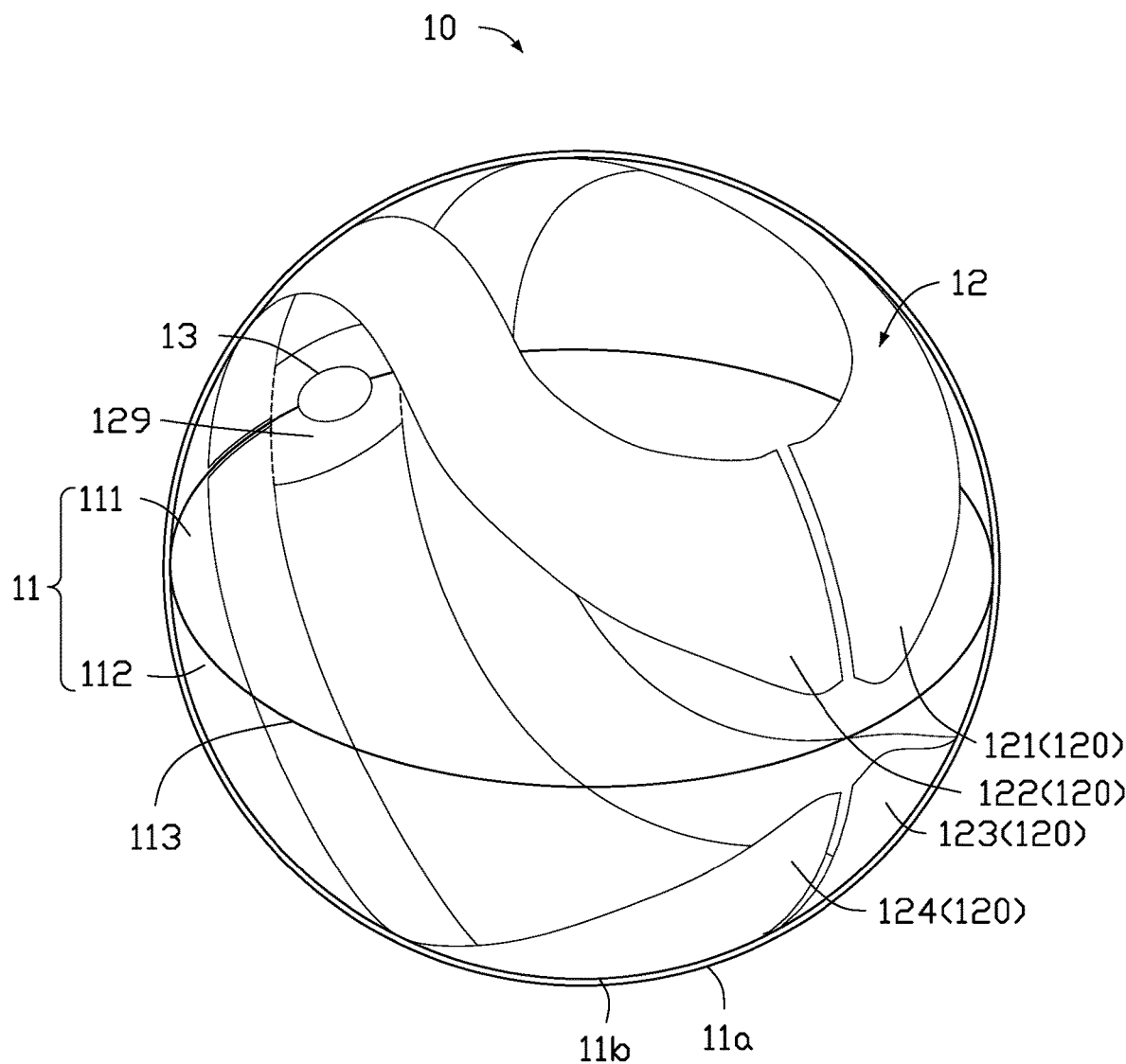
FIG. 1 is a perspective view of a spherical touch device according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one".

FIG. 1 shows a perspective view of a spherical touch device 10 according to an embodiment. The spherical touch device 10 includes a spherical casing 11 and at least one touch sensing layer 12. The spherical casing 11 has a hollow structure, and the spherical casing 11 includes an inner surface 11b and an outer surface 11a. The touch sensing layer 12 is a laminar structure having a touch sensing function, and the touch sensing layer 12 is attached to the inner surface 11b of the spherical casing 11. The touch sensing layer 12 can be adhered to the inner surface 11b of the spherical casing 11 by a transparent adhesive, such as optically-clear adhesive (OCA).

The spherical casing 11 is a transparent or translucent material. In an embodiment, the material of the spherical casing 11 may be organic, such as polycarbonate (PC), polyimide (PI), polyethylene naphthalate two formic acid glycol ester (PEN), polyethylene terephthalate (PET), or cyclo-olefin polymer (COP). The material of spherical casing 11 may also be an inorganic substance, such as silicon dioxide ($SiO_2$).

The spherical casing 11 includes an upper hemisphere 111 and a lower hemisphere 112 which are identical structure and symmetrically disposed. The upper hemisphere 111 and the lower hemisphere 112 are combined together to form a spherical casing 11. Dividing the spherical casing 11 into the upper hemisphere 111 and the lower hemisphere 112 makes the spherical casing 11 easily manufactured, and provides operation space for the assembly between the spherical casing 11 and other components.

The touch sensing layer 12 has a touch sensing function for touches on the surface of the spherical casing 11. The touch sensing layer 12 can be a flexible printed circuit (FPC) which can sense the touch operations through the circuit on its surface. The touch sensing layer 12 can also be other structures with touch sensing functions, and these structures include at least a conductive material for sensing touch, such as indium tin oxide (ITO) or metal mesh.

Figure 2:
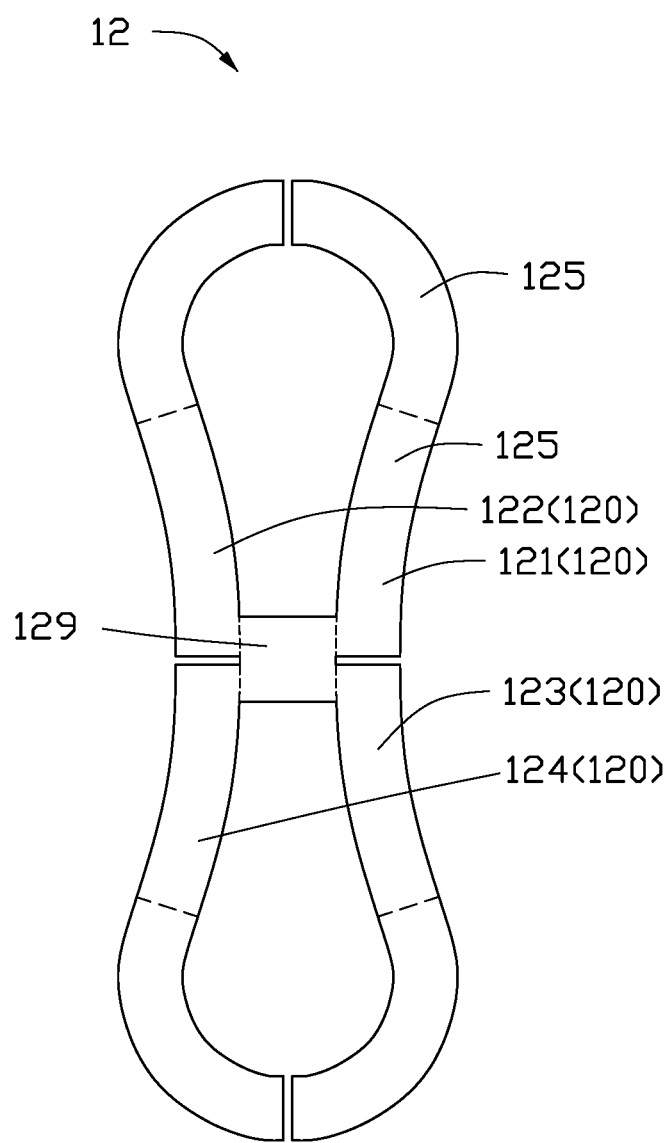
FIG. 2 is a planar view of a touch sensing layer of the spherical touch device of FIG. 1.

FIG. 2 shows a planar view of a touch sensing layer 12 of the spherical touch device 10 of the first embodiment. In an embodiment, the touch sensing layer 12 includes a core portion 129 and a touch portion 120. The touch portion 120 includes a plurality of sub-touch portions (121, 122, 123, and 124). Each sub-touch portion may be strip-shaped. The touch portion 120 is formed by the core portion 129 extending and diverging in a direction away from the core portion 129. The touch sensing layer 12 extends in and is attached to a predefined region of the inner surface 11b of the spherical casing 11. An area of each sub-touch portion is greater than an area of the core portion 129.

In an embodiment, the core portion 129 is substantially a rectangular region, and the touch portion 120 extends from the four corners of the rectangular core portion 129. The touch portion 120 includes a plurality of sub-touch portions (121, 122, 123, and 124). The plurality of sub-touch portions of the touch portion 120 includes a first sub-touch portion 121, a second sub-touch portion 122, a third sub-touch portion 123, and a fourth sub-touch portion 124 which are the same structure and not in contact with each other. Each sub-touch portion is formed by splicing a plurality of segmented fan rings 125 adjacent to each other, and the diameter of the bottom circle of each fan ring 125 is greater than 0.2 mm.

The first sub-touch portion 121 and the second sub-touch portion 122 are located on one of the upper hemisphere 111 and the lower hemisphere 112, and the third sub-touch portion 123 and the fourth sub-touch portion 124 are located on the other which is opposite the first sub-touch portion 121 and the second sub-touch portion 122. In an embodiment, the first sub-touch portion 121 and the second sub-touch portion 122 are located on the lower hemisphere 112, and the third sub-touch portion 123 and the fourth sub-touch portion 124 are located on the upper hemisphere 111. The ends of the first sub-touch portion 121 and the second sub-touch portion 122 away from the core portion 129 are adjacent but not in contact.

In one embodiment, the first sub-touch portion 121 and the second sub-touch portion 122 are symmetrically located with the third sub-touch portion 123 and the fourth sub-touch portion 124. In other embodiments, the layout of the touch portion 120 can be adjusted according to specific needs. When the touch portion 120 and the core portion 129 are tiled in the same plane, in an embodiment, the touch portion 120 and the core portion 129 generally form an "8" shape.

As shown in FIG. 1, the core portion 129 is disposed at a boundary between the upper hemisphere 111 and the lower hemisphere 112, and the core portion 129 covers at least a portion of a boundary line 113 between the upper hemisphere 111 and the lower hemisphere 112. Half of the sub-touch portions of the touch portion 120 are located on the inner surface 11b of the upper hemisphere 111, the other half of the sub-touch portions of the touch portion 120 is located on the inner surface 11b of the lower hemisphere 112. In one embodiment, the first sub-touch portion 121 and the second sub-touch portion 122 are located on the upper hemisphere 111, and the third sub-touch portion 123 and the fourth sub-touch portion 124 are located on the lower hemisphere 112. The touch portion 120 extends from the core portion 129 to the upper hemisphere 111 or to the lower hemisphere 112, and finally extends to the combined portion of the upper hemisphere 111 and the lower hemisphere 112 away from the core portion 129 side.

The spherical touch device 10 further includes a processing unit 13. The processing unit 13 is attached to a surface of the core portion 129 away from the spherical casing 11 and electrically connected to the core portion 129. The touches sensed by the touch portion 120 are transmitted to the processing unit 13 through the core portion 129. The processing unit 13 can analyze the electrical signals of the touch portion 120.

When the spherical casing 11 is gripped or touched, the touch portion 120 can provide a change in the electrical signals to transmit to the process unit 33, and the processing unit 13 analyzes the change in the electrical signals of the touch portion 120 to determine a position of the touch or a manner of holding and provide different feedback correspondingly.

In the spherical touch device 10 of this embodiment, the touch sensing layer 12 has the touch portion 120 on the inner surface 11b of the transparent or translucent hollow spherical casing 11 so that the spherical touch device 10 has a simple and effective structure to reduce cost, and is useful and easy to manufacture.

Figure 3:
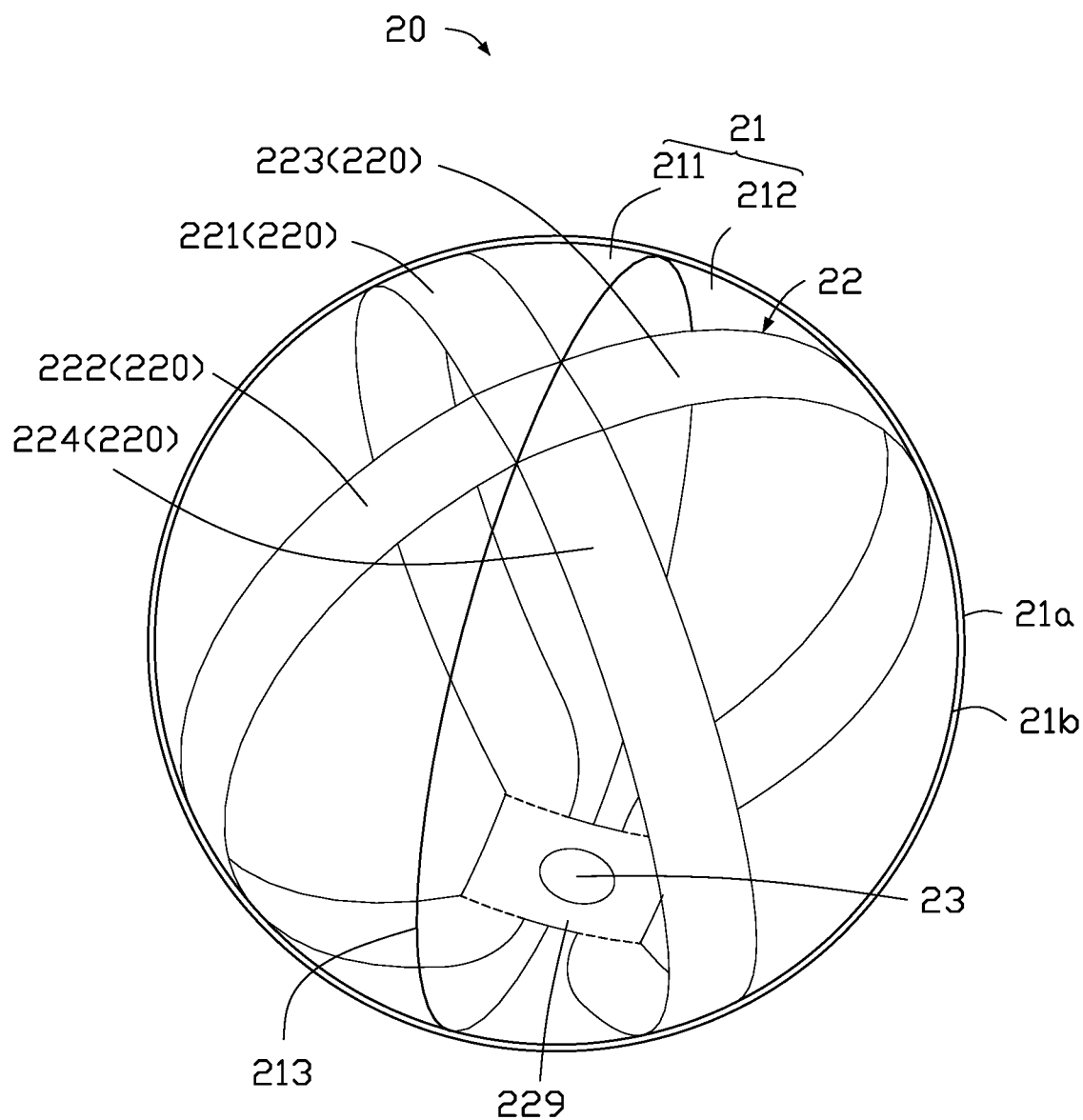
FIG. 3 is a perspective view of a spherical touch device according to a second embodiment.

FIG. 3 shows a perspective view of a spherical touch device 20 according to an embodiment. The spherical touch device 20 includes a spherical casing 21 and at least one touch sensing layer 22. The spherical casing 21 has a hollow structure, and the spherical casing 21 includes an inner surface 21b and an outer surface 21a on opposite sides of the casing. The touch sensing layer 22 is a laminar structure having a touch sensing function, the touch sensing layer 22 is attached to the inner surface 21b of the spherical casing 21. The touch sensing layer 22 can be adhered to the inner surface 21b of the spherical casing 21 by a transparent adhesive, such as OCA.

The spherical casing 21 is a transparent or translucent material. In an embodiment, the material of the spherical casing 21 may be organic, such as polycarbonate (PC), polyimide (PI), polyethylene naphthalate two formic acid glycol ester (PEN) polyethylene terephthalate (PET), or cyclo-olefin polymer (COP). The material of spherical casing 21 may also be an inorganic substance, such as silicon dioxide ($SiO_2$).

The spherical casing 21 includes an upper hemisphere 211 and a lower hemisphere 212. The upper hemisphere 211 and the lower hemisphere 212 are identical in structure and symmetrically disposed, and the upper hemisphere 211 and the lower hemisphere 212 are combined together to form a spherical casing 21. Dividing the spherical casing 21 into the upper hemisphere 211 and the lower hemisphere 212 makes the spherical casing 21 easily manufactured, and provides operation space for the assembly between the spherical outer casing 21 and other components.

The touch sensing layer 22 has a touch sensing function for sensing touches on the surface of the spherical casing 21. The touch sensing layer 22 can be a flexible printed circuit (FPC) which can sense the touch operations through the circuit on its surface. The touch sensing layer 22 can also be other materials and structures with touch sensing functions, indium tin oxide (ITO) or metal mesh for example.

Figure 4:
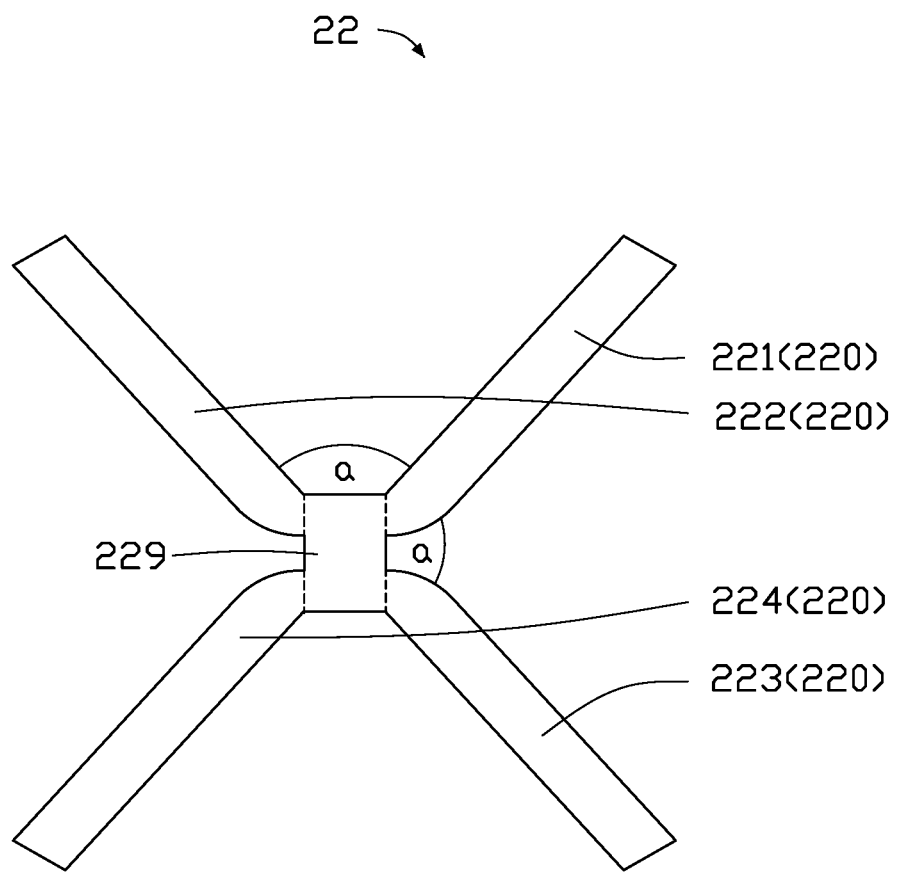
FIG. 4 is a planar view of a touch sensing layer of the spherical touch device of FIG. 3.

FIG. 4 shows a planar view of a touch sensing layer 22 of the spherical touch device 20 of the embodiment. In this embodiment, the touch sensing layer 22 includes a core portion 129 and a touch portion 220. The touch portion 220 includes a plurality of sub-touch portions (221, 222, 223, and 224), each sub-touch portion may be strip-shaped. The touch portion 220 is formed by the portion 229 extending and diverging towards a direction away from the core portion 229. The touch sensing layer 22 extends in and is attached to a predefined region of the inner surface 21b of the spherical casing 21. An area of each the sub-touch portion is greater than an area of the core portion 229.

In an embodiment, the core portion 229 is substantially a rectangular region, and the touch portion 220 extends from the four corners of the rectangular core portion 229. The touch portion 220 includes a plurality of sub-touch portions (221, 222, 223, and 224). The plurality of sub-touch portions of the touch portion 220 includes a first sub-touch portion 221, a second sub-touch portion 222, a third sub-touch portion 223, and a fourth sub-touch portion 224 which are the same structure, and not in contact with each other. Each sub-touch portion is a stripe structure having a rectangular shape, and a length of a long side of each sub touch portion is greater than or equal to four times of the length of a short side of the sub touch portion.

The first sub-touch portion 221 and the second sub-touch portion 222 are located on one of the upper hemisphere 211 or the lower hemisphere 212, and the third sub-touch portion 223 and the fourth sub-touch portion 224 are located on the other which is opposite the first sub-touch portion 221 and the second sub-touch portion 222. In one embodiment, the first sub-touch portion 221 and the second sub-touch portion 222 are symmetrically located with the third sub-touch portion 223 and the fourth sub-touch portion 224, and angles α between adjacent two sub-touch portions are the same. In an embodiment, the touch portion 220 can be adjusted to other layouts according to specific needs. When the touch portion 220 and the core portion 229 are tiled in the same plane, in an embodiment, the touch portion 220 and the core portion 229 generally form an "X" shape.

As shown in FIG. 3, the core portion 229 is located at a boundary between the upper hemisphere 211 and the lower hemisphere 212, and the core portion 229 covers at least a portion of a boundary line 213 between the upper hemisphere 211 and the lower hemisphere 212, and half of the sub-touch portions of the touch portion 220 are located on the inner surface 21b of the upper hemisphere 211, and the other half of the sub-touch portions of the touch portion 220 are located on the inner surface 21b of the lower hemisphere 212. The touch portion 220 extends from the core portion 229 to the upper hemisphere 211 or the lower hemisphere 212, and finally extends to the combined portion of the upper hemisphere 211 and the lower hemisphere 212 away from the core portion 229.

The spherical touch device 20 further includes a processing unit 23. The processing unit 13 is attached to a surface of the core portion 229 away from the spherical casing 21 and electrically connected to the core portion 229. The electrical signals sensed by the touch portion 220 are transmitted to the processing unit 23 through the core portion 229. The processing unit 23 can analyze the electrical signals of the touch portion 220.

When the spherical casing 21 is gripped or touched, the touch portion 220 can provide a change in the electrical signals to transmit to the process unit 33, and the processing unit 23 analyzes the changed electrical signal of the touch portion 220 to determine a position of the touch or a manner of holding and provide different feedback correspondingly.

Figure 5:
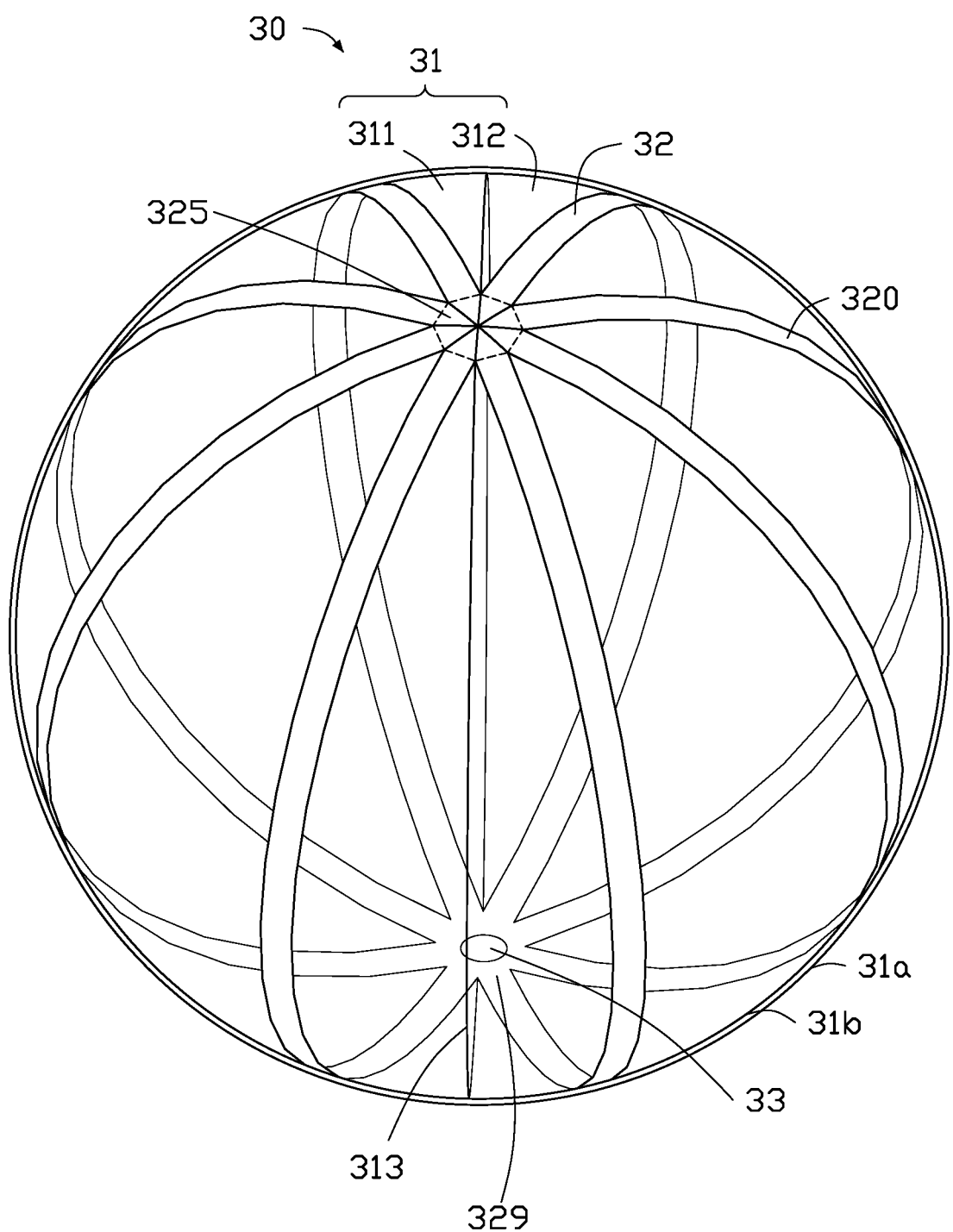
FIG. 5 is a perspective view of a spherical touch device according to a third embodiment.

FIG. 5 shows a perspective view of a spherical touch device 30 according to an embodiment. The spherical touch device 30 includes a spherical casing 31 and at least one touch sensing layer 32. The spherical casing 31 has a hollow structure, and the spherical casing 31 includes an inner surface 31b and an outer surface 31a on opposite sides of the casing. The touch sensing layer 32 is a laminar structure having a touch sensing function, and the touch sensing layer 32 is attached to the inner surface of the spherical casing 31. The touch sensing layer 32 can be adhered to the inner surface 31b of the spherical casing 31 by a transparent adhesive, such as OCA.

The spherical casing 31 is a transparent or translucent material. In an embodiment, the material of the spherical casing 31 may be organic, such as polycarbonate (PC), polyimide (PI), polyethylene naphthalate two formic acid glycol ester (PEN) polyethylene terephthalate (PET), or cyclo-olefin polymer (COP). The material of spherical casing 31 may also be an inorganic substance, such as silicon dioxide ($SiO_2$).

The spherical casing 31 includes an upper hemisphere 311 and a lower hemisphere 312 which are identical in structure and disposed. The upper hemisphere 311 and the lower hemisphere 312 are combined together to form a spherical casing 31. Dividing the spherical casing 31 into the upper hemisphere 311 and the lower hemisphere 312 which are engaged with each other makes the spherical casing 31 to be easily manufactured, and provides sufficient operation space for the assembly between the spherical casing 31 and other components.

The touch sensing layer 32 has a touch sensing function for sensing touch operations on the surface of the spherical casing 31. The touch sensing layer 32 can be a flexible printed circuit (FPC) which can sense the touch operations through the circuit on its surface. The touch sensing layer 32 can also be other materials and structures with touch sensing functions, and these should include at least a conductive material for sensing touch, such as indium tin oxide (ITO) or metal mesh.

Figure 6:
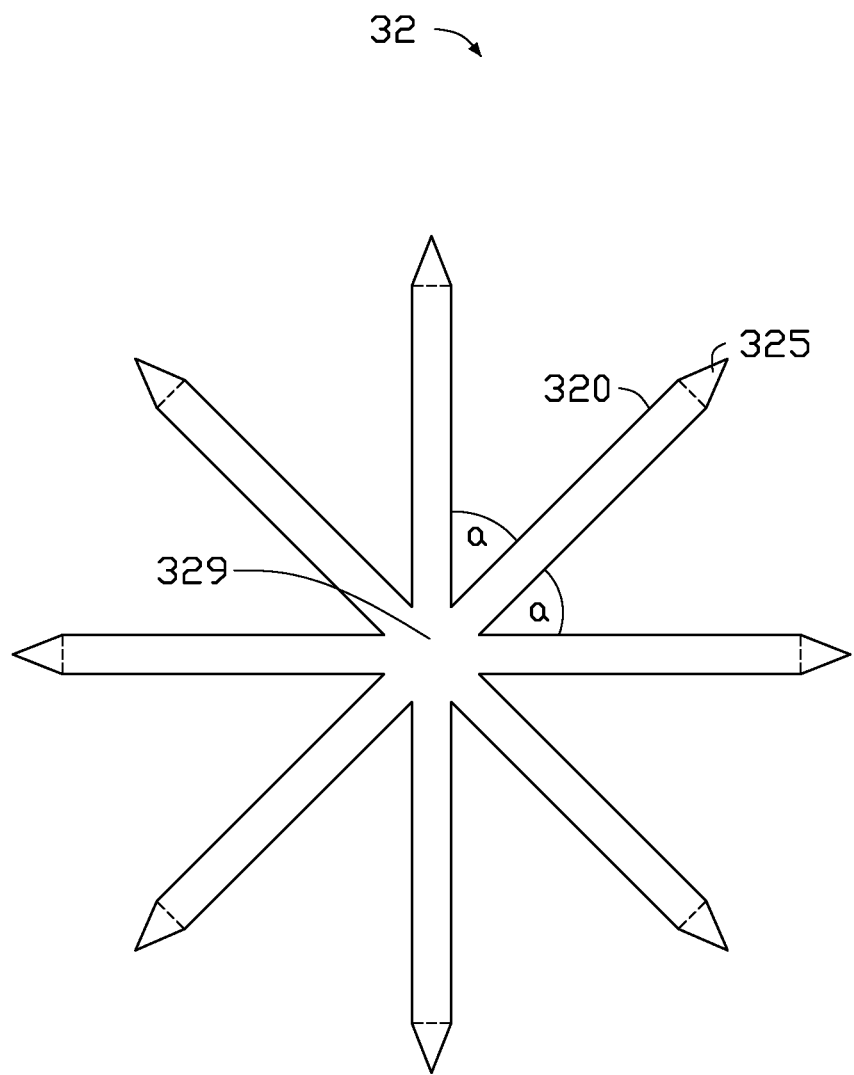
FIG. 6 is a planar view of a touch sensing layer of the spherical touch device of FIG. 5.

FIG. 6 shows a planar view of a touch sensing layer 32 of the spherical touch device 30 of the embodiment. In this embodiment, the touch sensing layer 32 includes a core portion 329 and a touch portion 320. The touch portion 320 includes a plurality of sub-touch portions, and the main body of each sub-touch portion may be strip-shaped. The touch portion 320 is formed by the core portion 329 extending and diverging away from the core portion 329. The touch sensing layer 32 extends into and is attached to a predefined region of the inner surface 31b of the spherical casing 31. An area of each sub-touch portion is greater than an area of the core portion 329.

In an embodiment, the core portion 329 is substantially a circular area, and the touch portion 320 extends from the circular core portion 329. The touch portion 320 includes eight sub-touch portions, and each of the eight sub-touch portions has the same structure. The main body of each sub-touch portion is a stripe structure having a rectangular shape. The end of each sub-touch portion away from the core portion 329 is a triangular extending region 325. A length of a long side of one sub-touch portion is greater than or equal to four times of a length of a short side of the sub-touch portion. When the touch portion 320 and the core portion 329 are tiled in the same plane, in an embodiment, the touch portion 320 and the core portion 329 generally form the shape of an asterisk, i.e., *, and the plurality of sub-touch portions are centrally symmetrical with the core portion 329, and angles α between each adjacent two sub-touch portions are the same.

As shown in FIG. 5, the core portion 329 is located at a boundary between the upper hemisphere 311 and the lower hemisphere 312, and the core portion 329 covers at least a portion of a boundary line 313 between the upper hemisphere 311 and the lower hemisphere 312. Half of sub-touch portions of the control portion 320 are located on the inner surface 31b of the upper hemisphere 311, and the other half of the sub-touch portions of the touch portion 320 are located on the inner surface 31b of the lower hemisphere 312. The touch portion 320 extends from the core portion 329 to the upper hemisphere 311 or the lower hemisphere 312, and finally extends to the fastening portion of the upper hemisphere 311 and the lower hemisphere 312 away from the core portion 329. The plurality of extending regions 325 are at the combined portion. A plurality of the extending regions 325 is adjacent to each other and sequentially spliced.

The spherical touch device 30 further includes a processing unit 33. The processing unit 33 is attached to a surface of the core portion 329 away from the spherical casing 31 and electrically connected to the core portion 329. The touches sensed by the touch portion 320 are transmitted to the core portion 329 and transmitted to the processing unit 33 through the core portion 329. The processing unit 33 can analyze electrical signals from the touch portion 320.

When the spherical casing 31 is gripped or touched, the touch portion 320 can provide a change in the electrical signals to transmit to the process unit 33. The processing unit 33 analyzes the change in the electrical signals of the touch portion 320 to determine a position of the touch or a manner of holding and provide different feedback correspondingly.

Figure 7:
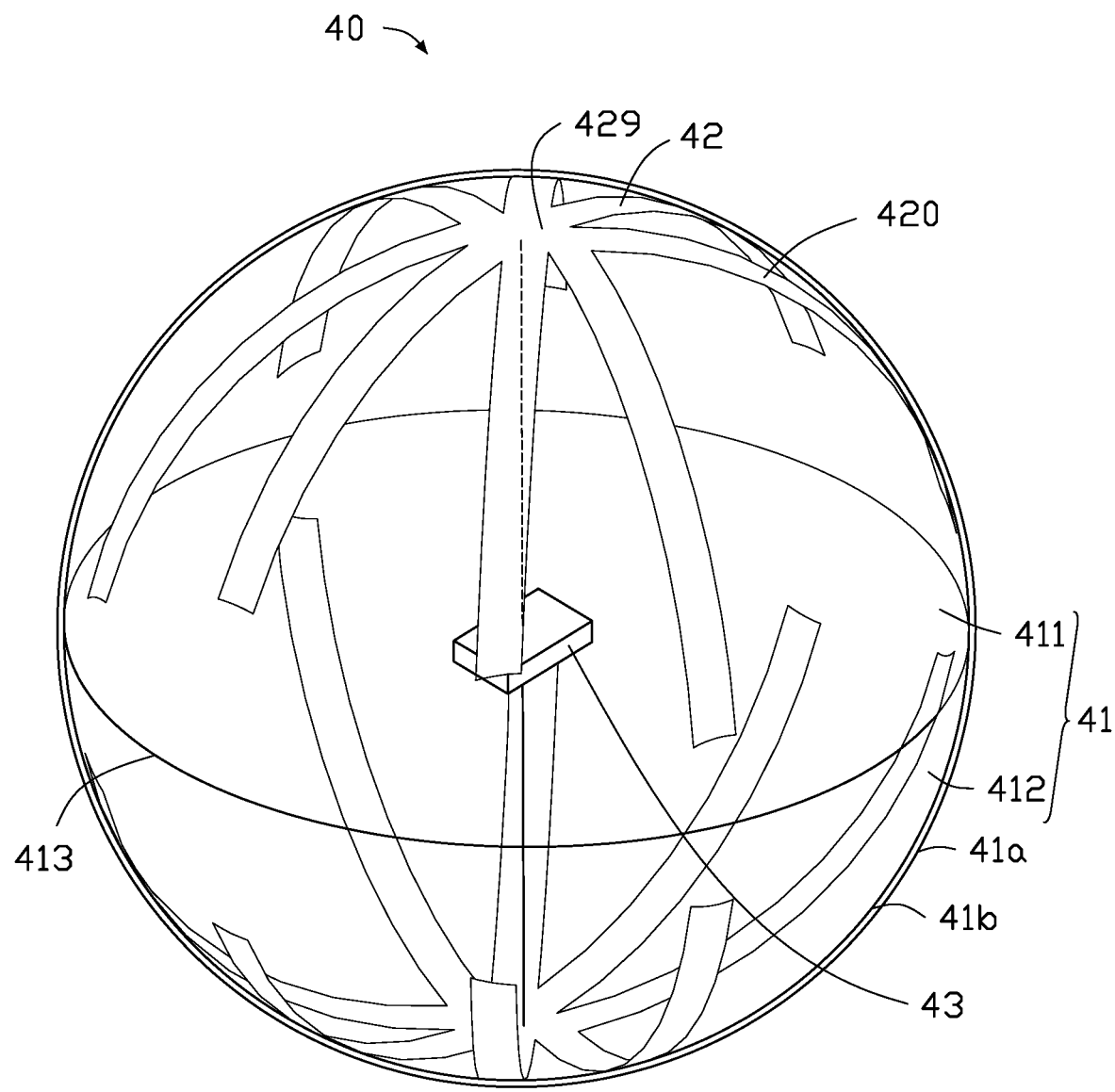
FIG. 7 is a perspective view of a spherical touch device according to a fourth embodiment.

FIG. 7 shows a perspective view of a spherical touch device 40 according to an embodiment. The spherical touch device 40 includes a spherical casing 41 and at least one touch sensing layer 42. The spherical casing 41 has a hollow structure, and the spherical casing 41 includes an inner surface 41b and an outer surface 41a on opposite sides of the casing. The touch sensing layer 42 is a laminar structure having a touch sensing function, the touch sensing layer 42 is attached to the inner surface 41b of the spherical casing 41. The touch sensing layer 42 can be adhered to the inner surface 41b of the spherical casing 41 by a transparent adhesive, such as OCA.

The spherical casing 41 is a transparent or translucent material. In an embodiment, the material of the spherical casing 41 may be organic, such as polycarbonate (PC), polyimide (PI), polyethylene naphthalate two formic acid glycol ester (PEN) polyethylene terephthalate (PET) and cyclo-olefin polymer (COP). The material of spherical casing 41 may also be an inorganic substance, such as silicon dioxide (SiO$_2$).

The spherical casing 41 includes an upper hemisphere 411 and a lower hemisphere 412. The upper hemisphere 411 and the lower hemisphere 412 are identical in structure and symmetrically disposed, and the upper hemisphere 411 and the lower hemisphere 412 are combined together to form a spherical casing 41. Dividing the spherical casing 41 into the upper and lower hemisphere 411 and the lower hemisphere 412 which are engaged with each other makes the spherical casing 41 to be easily manufactured, and provides sufficient operation space for the assembly between the spherical casing 41 and other components.

The touch sensing layer 42 has a touch sensing function for sensing touch operations on the surface of the spherical casing 41. The touch sensing layer 42 can be a flexible printed circuit (FPC) which can sense the touch operations through the circuit on its surface. The touch sensing layer 42 can also be other materials and structures with touch sensing functions, and these should include at least a conductive material for sensing touch, such as indium tin oxide (ITO) or metal mesh.

Figure 8:
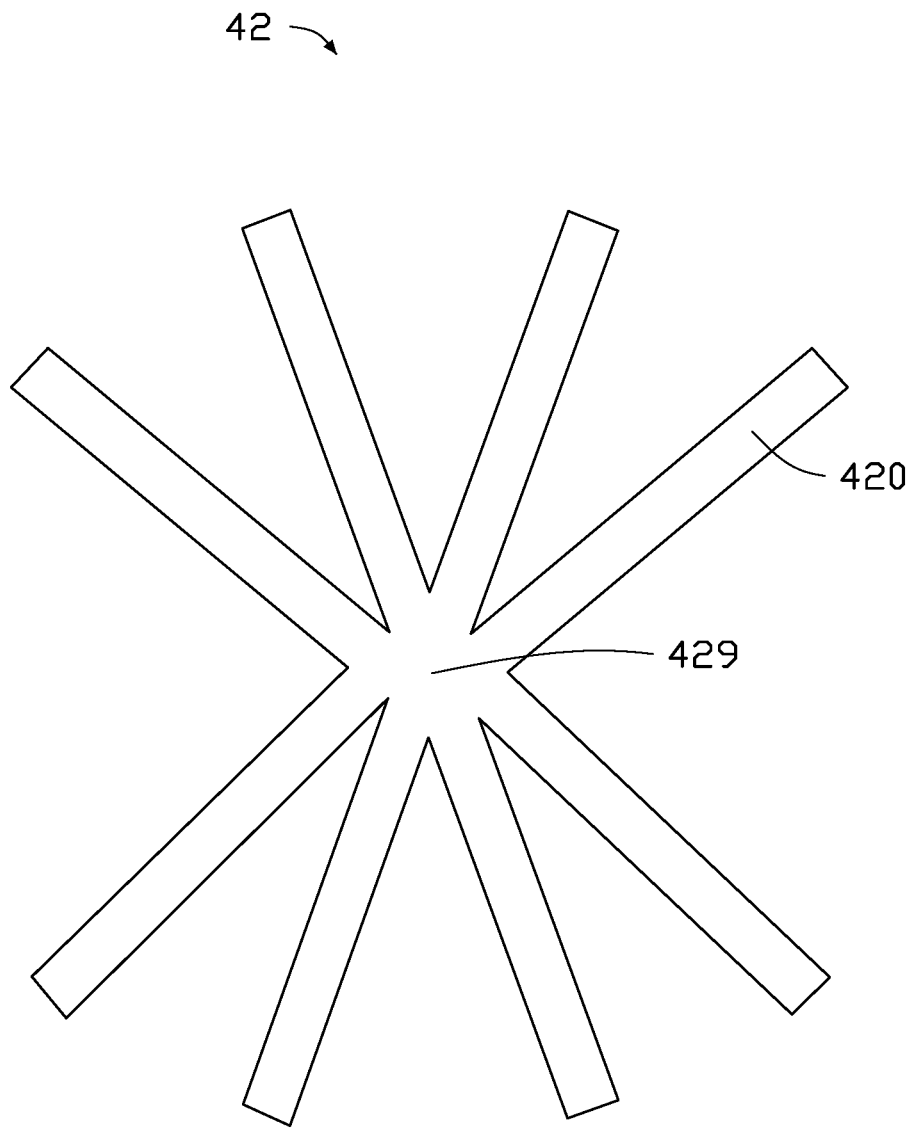
FIG. 8 is a planar view of a touch sensing layer of the spherical touch device of FIG. 7.

FIG. 8 shows a planar view of a touch sensing layer 42 of the spherical touch device 40 of an embodiment. In this embodiment, the touch sensing layer 42 includes a core portion 429 and a touch portion 420. The touch portion 420 includes a plurality of sub-touch portions, and the main body of each sub-touch portion may be strip-shaped. The touch portion 420 is formed by the core portion 429 extending and diverging away from the core portion 429. The touch sensing layer 42 extends into and is attached to a predefined region of the inner surface 41b of the spherical casing 41. An area of each sub-touch portion is greater than an area of the core portion 429.

In an embodiment, the core portion 429 is substantially a circular area, and the circular core portion 429 extends from the touch portion 420. The touch portion 420 includes eight sub-touch portions, and each of the eight sub-touch portions which are the same structures. Each sub-touch portion has a rectangular strip structure, and a length of a long side of each sub-touch portion is greater than or equal to four times of the length of a short side of the sub-touch portion.

As shown in FIG. 7, the spherical touch device 40 includes two touch sensing layers 42 which are the same structures. The two touch sensing layers 42 are respectively located on the inner surface of the upper hemisphere 411 and the inner surface of the lower hemisphere 412. The core portion 429 and the sub-touch portion 420 of the two touch sensing layers 42 are symmetrical with respect to the center of the spherical touch device 40. In other embodiments, the two touch sensing layers 42 respectively located on the upper hemisphere 411 and the lower hemisphere 412 may have different structures, and the touch portion 420 may be adjusted to other reasonable layouts according to specific needs.

The spherical touch device 40 further includes a processing unit 43. In an embodiment, the processing unit 43 is located in a hollow region in the spherical touch device 40. The processing unit 43 is located substantially at the center of the spherical casing 41, and the processing unit 43 is electrically connected to the core portion 429 by a wire. The touches sensed by the touch portion 420 are transmitted to the core portion 429 and transmitted to the processing unit 43 through the core portion 429. The processing unit 43 can analyze the electrical signals of the touch portion 420.

When the spherical casing 41 is gripped or touched, the touch portion 420 can provide a change in the electrical signal to transmit to a process unit 33, and the processing unit 43 analyzes the changed electrical signal of the touch portion 420 to determine the position of the touch or the manner of holding, and according to this, provides different feedback solutions.

In the spherical touch device 40 of the embodiment, the touch sensing layer 42 has a touch portion 420 on the inner surface of the transparent or translucent hollow spherical casing 41, so that the spherical touch device 40 has a simple and effective structure to reduce cost, and is convenient to manufacture and widely used.

It can be understood that although the above embodiments are described by reference to examples, the present disclosure is not limited to in the form of the touch device. The present disclosure also covers other curved touch devices, such as touch device having a shape of an olive. The curved touch device includes a curved casing and at least one touch sensing layer. The curved casing includes an inner surface and an outer surface on opposite sides of the casing. The touch sensing layer is attached to the inner surface of the curved casing. The touch sensing layer includes a core portion and a plurality of strip-shaped sub-touch portions, and the plurality of sub-touch portions are formed by extending the core portion outwardly. The area of each sub-touch portion is greater than the area of the core portion. The touch sensing layer in the curved device may be any one of the touch sensing layers of the above embodiments.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A spherical touch device, comprising:
   a spherical casing being a hollow structure, comprising an inner surface and an outer surface on opposite sides of the spherical casing; and at least one touch sensing layer configured to attach to the inner surface of the spherical casing, wherein the touch sensing layer comprises a core portion and a touch portion, the touch portion is formed by the core portion extending apart towards a direction away from the core portion, and the touch portion comprises a plurality of sub-touch portions, an area of each of the plurality of sub-touch portions is greater than an area of the core portion;

wherein the spherical casing comprises an upper hemisphere and a lower hemisphere; the upper hemisphere and the lower hemisphere are identical in structure and symmetrically distributed; and the upper hemisphere and the lower hemisphere are combined together to form the spherical casing; and wherein the core portion covers at least a portion of a boundary line between the upper hemisphere and the lower hemisphere, half of the sub-touch portions of the touch portion are located on an area of the inner surface corresponding to the upper hemisphere, and an other half of the sub-touch portions of the touch portion are located on an area of the inner surface corresponding to the lower hemisphere.

2. The spherical touch device according to claim 1, wherein each of the plurality of sub-touch portions is formed by splicing a plurality of segmented fan rings adjacent to each other, and in the sub-touch portion of the upper hemisphere or the lower hemisphere, ends of adjacent two of the plurality of sub-touch portions away from the core portion are adjacent but not in contact.

3. The spherical touch device according to claim 1, wherein each of the plurality of sub-touch portions has a rectangular structure, and a length of a long side is greater than or equal to four times of a length of a short side of each of the plurality of the sub-touch portions.

4. The spherical touch device according to claim 3, wherein angles between each adjacent two of the sub-touch portions are the same, and an end of each of the sub-touch portions away from the core portion extends to a region on the spherical casing that is symmetrical with the core portion with respect to a center of the spherical casing.

5. The spherical touch device according to claim 4, wherein an end of each of the sub-touch portions away from the core portion further comprises a triangular extending region, and the extending regions are adjacent to each other and sequentially spliced.

6. The spherical touch device according to claim 1, further comprising two touch sensing layers, wherein the two touch sensing layers are respectively located in the upper hemisphere and the lower hemisphere.

7. The spherical touch device according to claim 1, further comprising a processing unit, wherein the processing unit is electrically connected to the core portion, and the processing unit is attached to one side of the touch sensing layer.

8. A curved touch device, comprising:
a curved casing comprising an inner surface and an outer surface on opposite sides of the curved casing; and
at least one touch sensing layer, configured to attach to the inner surface of the curved casing,
wherein the touch sensing layer comprises a core portion and a touch portion, the touch portion is formed by the core portion extending outwardly, the touch portion comprises a plurality of sub-touch portions, and an area of each of the plurality of sub-touch portions is greater than an area of the core portion;
wherein each of the plurality of sub-touch portions has a rectangular structure, and a length of a long side of is greater than or equal to four times of the length of a short side of each of the plurality of the sub-touch portions;
wherein angles between each adjacent two of the sub-touch portions are the same; and
wherein an end of each of the sub-touch portions away from the core portion further comprises a triangular extending region, and the extending regions are adjacent to each other and sequentially spliced.

* * * * *